July 7, 1959 — J. R. MILES — 2,893,290
OPTICAL SIGHTING LENS SYSTEMS
Filed Oct. 16, 1956

INVENTOR.
John R. Miles,
BY Wilkinson, Huxley,
Byron + Hume
Attys.

United States Patent Office 2,893,290
Patented July 7, 1959

2,893,290
OPTICAL SIGHTING LENS SYSTEMS

John R. Miles, Glenview, Ill., assignor to Chicago Aerial Industries, Inc., Melrose Park, Ill., a corporation of Illinois Application October 16, 1956, Serial No. 616,258

23 Claims. (Cl. 88—57)

This invention relates to optical sighting systems and more particularly to systems of the periscope type such as a large exit pupil viewfinder, for example. Such systems are of increasing usefulness as equipment for modern aircraft, and particularly military aircraft where the field of view of the occupants is rather severely limited by the configuration of the fuselage designed for very high speed travel.

Such equipment, to be of maximum utility, must permit the image formed by the instrument to be viewed with both eyes of the observer. Likewise, a substantial amount of lateral head movement must be possible without encountering undesirable distortion of the image. Various means have been utilized in prior art devices to provide a substantial amount of lateral head movement such as the use of a beamsplitting means to produce two exit pupils, one for each eye. In the present invention, however, a single relatively large exit pupil is provided that is capable of accommodating both eyes of the observer.

The use of a single exit pupil causes the eyes of the observer to be disposed on opposite sides of the exit pupil rather than in the center thereof. This unsymmetrical condition makes it necessary to have a highly corrected system in order to avoid parallax and differential distortion, or "swelling" of the image when the head of the observer is moved laterally.

Systems incorporating the present invention provide a pleasant, realistic, substantially distortion free image and have a greater utility than any prior art sighting device of this general character.

In order to accomplish these desired results, a number of novel elements have been incorporated among which is a wide angle objective that is substantially corrected for all the major aberrations except distortion, but which at the same time covers a field of about 85°. In wide angle viewfinders of the prior art the approach has normally been the opposite, namely, correction of distortion at the expense of the other aberrations. Here, however, distortion is not fully corrected in the image forming elements but is left to the field lenses to correct. Likewise, correction of the spherical aberration of the stop is accomplished primarily through the use of aspheric surfaces in these field lenses. In the objective used in the present system, for example, correction is made for field curvature, astigmatism, chromatic and lateral chromatic aberrations and coma. The distortion in the first image is corrected by the aspheric field lens alone, and more complete corrections of the other aberrations just mentioned can, therefore, be accomplished.

Another novel feature of the objective is that there is no vignetting. In fact the edge bundle is substantially larger than the center bundle in order to allow for the aperture change resulting from distortion compensation.

The wide angle objective aspheric field lens previously mentioned is also of novel construction and is a figure of revolution similar in some ways to a paraboloid of revolution. Although aspheric surfaces are used on the objective mirror of large astronomical telescopes, the application of such a configuration to a distortion correcting lens is believed to be novel. As mentioned, this lens is utilized to overcome two difficulties normally encountered in periscopes and viewfinders, namely, distortion and spherical aberration of the stop or of the principal rays. The overall shape of field lens corrects principally the distortion which exists in the wide angle objective and the aspheric surface thereof is used principally to correct the spherical aberration of the stop or principal rays.

The first erector of the system, although novel, is somewhat similar to a known prior art element, namely that disclosed in the U.S. Patent 1,786,916 dated December 30, 1930, to W. Merte.

The next element in the system, namely the wide angle reticle aspheric field lens, is used to direct the bundles of light which come from the first erector into the second erector. In this system it is necessary to correct or at least control the spherical aberration of the stop each time an image of the original object is formed. Such an image is formed four times in the system, which is the subject of this application, the fourth image being formed at the eye lens and being viewed directly by the eyes of the observer. The particular shape of the second surface of this lens, therefore, again corrects the spherical aberration of the stop while the general shape of the lens, as well as the aspheric surface thereof, corrects the distortion in the image resulting from the first erector. This lens, therefore, has a double function similar to the wide angle objective aspheric field lens previously described.

The second erector is the next lens assembly in the system and is an additional novel element comprising two sets of juxtaposed, identical, three lens elements. The use of duplicate sets in the lens system automatically corrects for coma and distortion and doubles the speed. Although the function of this erector is only to relay or reimage the object, it is very well corrected for spherical aberration of the image, chromatic aberration, field curvature, coma, distortion and astigmatism. A double Gauss system of this type is believed to be novel and no such system has previously been designed which approaches the performance of this relay lens.

It is, therefore, an object of this invention to provide a large exit pupil viewfinder particularly suited for use in aircraft which permits a substantial amount of lateral head movement of the observer without substantial distortion of the image.

It is also an object to provide the various components of such a system mentioned above having the novel characteristics previously enumerated.

Further objects and advantages of this invention will become evident as the description proceeds and from an examination of the accompanying drawings which illustrate one embodiment of the invention and in which similar numerals refer to similar parts throughout the several views.

Figure 1:
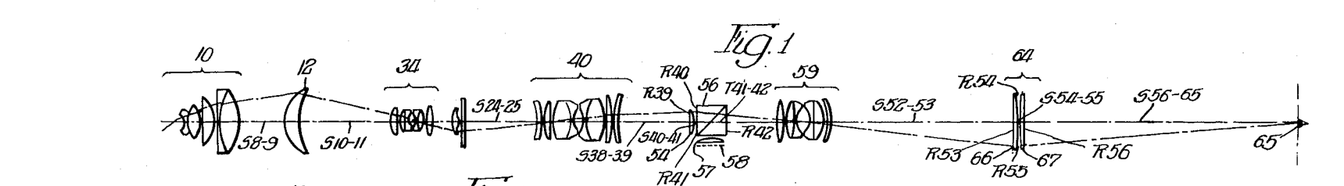
Figure 1 is a somewhat diagrammatic representation of a large exit pupil viewfinder system according to the invention.
Figure 2:
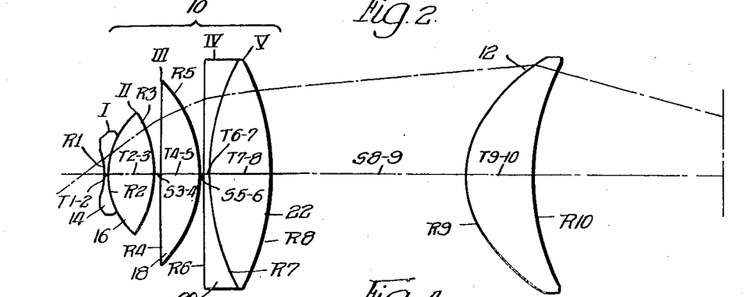
Figure 2 is an enlarged view of a portion of the viewfinder of Figure 1 illustrating the wide angle objective assembly and its associated aspheric field lens in greater detail.

Referring now to Figure 1, the wide angle objective shown therein is designated generally by the numeral 10 and the wide angle objective aspheric field lens associated with this assembly is designated by the numeral 12. The lens 14 is a double concave lens which is followed by two positive lenses 16 and 18. The fourth lens 20 is again a double concave lens, the lens 14 having at least five times the power of the lens 20. A final positive lens 22 completes the assembly. The data for one embodiment of this assembly is given in the following table:

TABLE 1

[Objective assembly   EF=119.4 mm.   PTZ=.00097]

| Lens | Radii | Thicknesses | Diameters | $n_d$ | $v$ |
|---|---|---|---|---|---|
| I | $R_1=-43.42$ | $T_{1-2}=2$ | $D_{1-2}=60.0$ | 1.720 | 29.2 |
|  | $R_2=+59.92$ |  |  |  |  |
| II |  | $T_{2-3}=34$ | $D_{2-3}=85.8$ | 1.574 | 56.8 |
|  | $R_3=-71.4$ | $S_{3-4}=1$ |  |  |  |
|  | $R_4=+1712.0$ |  |  |  |  |
| III |  | $T_{4-5}=30$ | $D_{4-5}=135.0$ | 1.620 | 60.0 |
|  | $R_5=-97.22$ | $S_{5-6}=1$ |  |  |  |
|  | $R_6=-1350.0$ |  |  |  |  |
| IV |  | $T_{6-7}=4$ | $D_{6-7}=168.0$ | 1.621 | 36.2 |
|  | $R_7=+201.84$ |  |  |  |  |
| V |  | $T_{7-8}=47$ | $D_{7-8}=168.0$ | 1.620 | 60.0 |
|  | $R_8=-151.16$ | $S_{8-9}=136$ |  |  |  |

The values given in the above table represent a preferred embodiment of the element, although other values could also be used. For example, all radii could vary by an amount such that the absolute value of their reciprocal would vary by a factor of ±.005, as long as technical compensations were made. The thicknesses could similarly vary by an amount of ±1.5 and the air spaces could vary by a factor of 3 or 4 to 1. The index of the glass in each instance could vary by a factor of ±.004 and the reciprocal dispersion factor or V-value by a factor of ±1.0.

The use of two similar indices of refraction in lenses 20 and 22 with a difference in the V-value makes its possible to correct the lateral chromatic aberration without increasing the mono-chromatic aberrations such as coma and the like. The large difference of index of refraction between lenses 14 and 16 is used with the radii $R_2$ and $R_3$ to aid in correcting spherical aberration and coma. Likewise, all of the principal air-glass surfaces have their center of curvature on the side of the surface where the aperture stop is placed, or are "forward curving," which characteristic is here used for the correction of astigmatism and field curvature.

The wide angle, objective, aspheric field lens 12 has a first surface $R_9$ which is aspheric. The equation for this surface is as follows:

$$X=+a\times 10^{-3}Y^2+b\times 10^{-6}Y^3-c\times 10^{-6}Y^4+d\times 10^{-9}Y^5$$

where $a$, $b$, $c$ and $d$ may have the following range of values:

| $a$ | $b$ | $c$ | $d$ |
|---|---|---|---|
| 7–7.5 | 13–13.5 | 0.1–0.3 | 2.0–3.0 | and where Y is the distance in millimeters of a point on the surface from the axis of the lens and X is the distance in millimeters of the same point from a plane perpendicular to the axis of the lens, and passing through the vertex of the aspheric surface, where the vertex is defined as the point where the axis of the lens intersects the aspheric surface.

The second surface of this lens may have a radius $R_{10}$ equal to between 160 and 180.

This lens may also be defined as a convex-concave aspheric field lens having its first surface aspheric with a vertex radius of curvature between .36 and .44 times the numerical value of the radius of curvature of the second surface and in which the center thickness is between .25 and .28 times the numerical value of the second radius of curvature and in which the aspheric surface departs from a spherical surface by an amount which is at least .055 times the numerical value of the second radius of curvature at a point on the aspheric surface which is at a distance from the axis of said lens equal to .45 times the numerical value of the second radius of curvature.

The complete data with respect to a preferred construction of this aspheric field lens 12 is shown in the following table:

TABLE 2

| Lens | Radii | Thicknesses | Diameters | $n_d$ | $v$ |
|---|---|---|---|---|---|
| I | $R_9=*$ | $T_{9-10}=46$ | $D_{9-10}=172.0$ | 1.517 | 64.5 |
|  | $R_{10}=+173.8$ | $S_{10-11}=246$ |  |  |  |

*This surface is the figure of revolution of a curve represented by the following equation: $X=+7.203602\times10^{-3}Y^2+13.220570\times10^{-6}Y^3-.267783\times10^{-6}Y^4+2.615655\times10^{-9}Y^5$.

As previously stated, the purpose of this field lens is to overcome two very troublesome difficulties normally found in periscopes and viewfinders, namely, distortion and spherical aberration of the stop or principal rays. Here the general shape of the aspheric lens is used principally to correct the distortion and the somewhat complex formula or equation of the aspheric surface is used principally to correct the spherical aberration of the stop or principal rays as previously mentioned.

Figure 3:
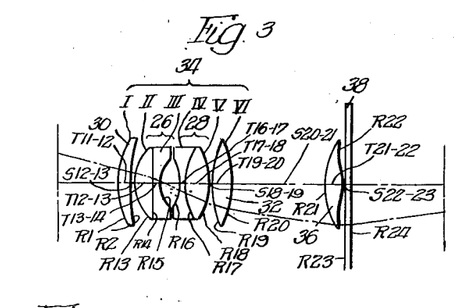
Figure 3 is an enlarged view of a portion of the viewfinder of Figure 1 showing the first erector assembly, the wide angle reticle aspheric lens and the reticle in greater detail.

The first erector, indicated generally by the numeral 34, includes the two strongly meniscus components 26 and 28 disposed between the two positive components 30 and 32, as shown in Figure 3. More specifically, this assembly comprises six elements in which the first element is convex-concave, the second element is double convex, the third and fourth elements are double concave, and the fifth and sixth elements are double convex. The sixth element is made of glass having an index higher than 1.62 and has a center thickness of at least 14% of the focal length and a first radius of curvature of between 1 times and 1.2 times the focal length of the erector. Likewise, the second radius of curvature of the sixth element is between 1.1 times and 1.3 times the focal length of the erector.

The following table gives the data regarding a preferred embodiment of this first erector:

TABLE 3

[First erector assembly   EF=82.076   PTZ=.0036]

| Lens | Radii | Thicknesses | Diameters | $n_d$ | $v$ |
|---|---|---|---|---|---|
| I | $R_{11}=+68.94$ | $T_{11-12}=9.6$ | $D_{11-12}=64.0$ | 1.645 | 48.0 |
|  | $R_{12}=+264.8$ | $S_{12-13}=1.3$ |  |  |  |
|  | $R_{13}=+36.95$ |  |  |  |  |
| II |  | $T_{13-14}=12.8$ | $D_{13-14}=50.0$ | 1.623 | 57.2 |
|  | $R_{14}=-948.4$ |  |  |  |  |
| III | $R_{15}=+23.34$ | $T_{14-15}=4.2$ | $D_{14-15}=50.0$ | 1.576 | 41.3 |
|  |  | $S_{15-16}=15.6$ |  |  |  |
|  | $R_{16}=-31.75$ |  |  |  |  |
| IV |  | $T_{16-17}=4.2$ | $D_{16-17}=50.0$ | 1.673 | 32.2 |
|  | $R_{17}=+41.64$ |  |  |  |  |
| V |  | $T_{17-18}=17.5$ | $D_{17-18}=50.0$ | 1.645 | 48.0 |
|  | $R_{18}=-43.88$ | $S_{18-19}=0.8$ |  |  |  |
|  | $R_{19}=+87.42$ |  |  |  |  |
| VI |  | $T_{19-20}=12.1$ | $D_{19-20}=63.0$ | 1.645 | 48.0 |
|  | $R_{20}=-98.9$ | $S_{20-21}=72$ |  |  |  |

As previously indicated, the wide angle reticle aspheric field lens 36 is used to direct the bundles of light which come from the first erector 34 into the second erector assembly indicated generally by the numeral 40. The field lens 36 has a double function just as the field lens 12 in that it is used to correct the spherical aberration of the stop and to correct the distortion in the image resulting from the first erector assembly 34, as previously mentioned.

This lens has a first surface $R_{21}$ which may have a radius equal to between 60 and 70. The second surface $R_{22}$ of this lens is aspheric and the equation for this surface is as follows:

$$**X = +a \times 10^{-3}Y^2 - b \times 10^{-6}Y^3 - c \times 10^{-6}Y^4 - d \times 10^{-9}Y^5$$

where $a$, $b$, $c$ and $d$ may have the following range of values:

| a | b | c | d |
|---|---|---|---|
| 3.0–3.6 | 20.0–23.0 | 1.0–1.5 | 1.0–1.2 |

This lens may also be defined as a double convex aspheric field lens in which the first surface is spherical and convex and the second surface is aspherical and convex, and in which the vertex radius of curvature of the aspheric surface is between 2 times and 2.5 times the radius of curvature of the first surface, and in which the aspheric surface departs from a spherical surface by at least .07 times the radius of curvature of the first surface at a point removed from the axis of the aspheric a distance of .47 times the radius of curvature of the first surface.

Data with respect to a preferred construction of this wide angle reticle aspheric lens 36 is shown in the following table:

TABLE 4

| Lens | Radii | Thicknesses | Diameters | $n_d$ | $\nu$ |
|---|---|---|---|---|---|
| I | $R_{21}=+65.1$ $R_{22}=**$ | $T_{21-22}=11.7$ $S_{22-23}=1.5$ | $D_{21-22}=61.89$ | 1.517 | 64.5 |

A suitable reticle 38, having two flat faces $R_{23}$ and $R_{24}$, is disposed in close association with the surface of the lens 36 farthest removed from the first erector 34. The remaining data with respect to the preferred construction of this reticle 38 is shown in the following table:

TABLE 5

| Lens | Radii | Thicknesses | Diameters | $n_d$ | $\nu$ |
|---|---|---|---|---|---|
| I | $R_{23}=\infty$ $R_{24}=\infty$ | $T_{23-24}=2.54$ $S_{24-25}=197.67$ | $D_{23-24}=127.0$ | 1.520 | 58.5 |

Figure 4:
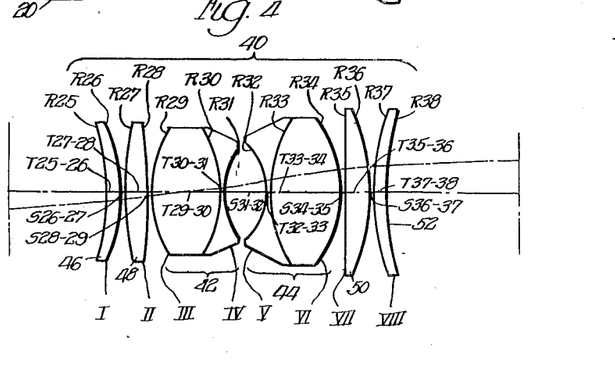
Figure 4 is an enlarged view of a portion of the viewfinder of Figure 1 showing the second erector assembly in greater detail.

This reticle is followed by a second erector assembly indicated generally by the numeral 40 having a pair of juxtaposed, thick, double meniscus components 42 and 44 disposed between two pairs of positive components 46 and 48 and 50 and 52. The following table gives the constructional details of this assembly 40, together with the data for the field lens 54 which is disposed between the second erector assembly 40 and the beamsplitting cube 56. The data for lens 54 and cube 56 is shown in Tables 7 and 8.

TABLE 6

[Second erector assembly EF=179.98 PTZ=.0015]

| Lens | Radii | Thicknesses | Diameters | $n_d$ | $\nu$ |
|---|---|---|---|---|---|
| I | $R_{25}=-199.32$ $R_{26}=-129.79$ | $T_{25-26}=10.59$ $S_{26-27}=1.06$ | $D_{25-26}=98.0$ | 1.620 | 60.0 |
| II | $R_{27}=+156.87$ $R_{28}=-919.08$ | $T_{27-28}=18.0$ $S_{28-29}=1.8$ | $D_{27-28}=98.0$ | 1.620 | 60.0 |
| III | $R_{29}=+91.93$ $R_{30}=-99.34$ | $T_{29-30}=50.84$ | $D_{29-30}=92.6$ | 1.620 | 60.0 |
| IV | $R_{31}=+52.28$ | $T_{30-31}=3.07$ $S_{31-32}=30.6$ | $D_{30-31}=92.6$ | 1.617 | 36.6 |
| V | $R_{32}=-52.28$ $R_{33}=+99.34$ | $T_{32-33}=3.07$ | $D_{32-33}=107.4$ | 1.617 | 36.6 |
| VI | $R_{34}=-91.93$ | $T_{33-34}=50.84$ $S_{34-35}=1.8$ | $D_{33-34}=107.4$ | 1.620 | 60.0 |
| VII | $R_{35}=+919.08$ $R_{36}=-156.87$ | $T_{35-36}=18$ $S_{36-37}=1.06$ | $D_{35-36}=118$ | 1.620 | 60.0 |
| VIII | $R_{37}=+129.79$ $R_{38}=+199.32$ | $T_{37-38}=10.59$ $S_{38-39}=203.35$ | $D_{37-38}=118$ | 1.620 | 60.0 |

TABLE 7

| Lens | Radii | Thicknesses | Diameters | $n_d$ | $\nu$ |
|---|---|---|---|---|---|
| I | $R_{39}=\infty$ $R_{40}=-95.0$ | $T_{39-40}=8.5$ $S_{40-41}=2.0$ | $D_{39-40}=68$ | 1.517 | 64.5 |

TABLE 8

| Lens | Radii | Thicknesses | Diameters | $n_d$ | $\nu$ |
|---|---|---|---|---|---|
| I | $R_{41}=\infty$ $R_{42}=\infty$ | $T_{41-42}=80.0$ $S_{42-43}=138.30$ | $D_{41-42}=80$ | 1.517 | 64.5 |

This second erector assembly differs from prior devices in that it has a thick, double meniscus having a strong concave inside surface and two positive elements on the convex side, the entire assembly being composed of two juxtaposed units of this kind with the outermost of said two positive elements in each pair being of meniscus shape with the concave surface thereof furthermost from the convex surface of the thick, double meniscus with which it is associated. As previously mentioned, although the function of this second erector assembly is only to reimage the objective, it is very well corrected for spherical aberration of the image, chromatic aberration, field curvature, coma, distortion and astigmatism. The speed of the particular lens assembly defined is faster than $f : 1.3$ while the spherical aberration is less than .01 millimeter.

This second erector can be further defined as an eight-element erector, in which the first four elements are shaped the same as its last four elements, but are arranged in a juxtaposed manner, and further, in which its first element is concave-convex, with its first radius of curvature concave and between 1.0 and 1.2 times the focal length of the complete erector, and in which its second radius of curvature is between .6 and .8 times the focal length of the complete erector, and in which its second element is double convex with its first radius of curvature between .8 and .9 times the focal length of the complete erector, and in which its second radius of curvature is between .5 and .6 times the focal length of the complete second erector, and in which its third element has its first radius of curvature between .4 and .6 times the focal length of the complete erector, and in which its second radius of curvature is between .5 and .6 times the focal length of the complete second erector, and in which its fourth element is double concave with its first radius of curvature between .5 and .6 times the focal length of the complete erector, with its second radius of curvature between .25 and .3 times the focal length of the complete second erector.

The beamsplitting cube 56 has a second field lens 57 disposed in association with the lower surface thereof which lens is identical with the lens 54. An illuminated reticle 58 is disposed in association with the lens 57. The purpose of such a reticle is to indicate ground speed or the like.

Figure 5:
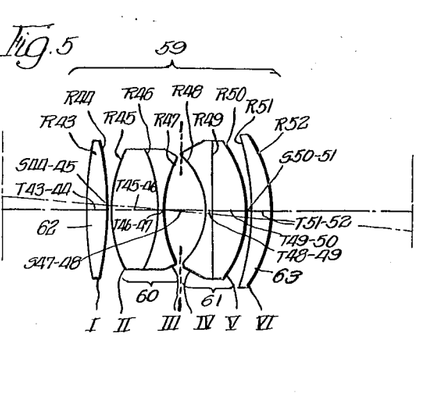
Figure 5 is an enlarged view of a portion of the viewfinder of Figure 1 showing the third erector in greater detail.

This assembly is followed by the third erector assembly which is indicated generally by the numeral 59. This assembly is a double Gauss system having two strongly bent double meniscus components, indicated generally by the numerals 60 and 61, having their concave surfaces $R_{47}$ and $R_{48}$ disposed in adjoining relation. The pair of double meniscus components is preceded by a double convex lens 62 and followed by a positive meniscus lens element 63 with the concave surface $R_{51}$ of the latter being disposed adjacent to the convex surface $R_{50}$ of the second double meniscus component. Table 9 gives the constructional details of this assembly:

TABLE 9

[Third erector assembly   EF=176.53   PTZ=.0016.]

| Lens | Radii | Thicknesses | Diameters | $n_d$ | $\nu$ |
|---|---|---|---|---|---|
| I | $R_{43}=+283.74$ | $T_{43-44}=16.46$ | $D_{43-44}=98$ | 1.645 | 48.0 |
|   | $R_{44}=-156.36$ | $S_{44-45}=.98$ |  |  |  |
| II | $R_{45}=+95.34$ | $T_{45-46}=34.86$ | $D_{45-46}=88.5$ | 1.645 | 48.0 |
| III | $R_{46}=-90.46$ | $T_{46-47}=3.85$ | $D_{46-47}=88.5$ | 1.673 | 32.2 |
|   | $R_{47}=+68.99$ | $S_{47-48}=28.78$ |  |  |  |
| IV | $R_{48}=-50.7$ | $T_{48-49}=3.85$ | $D_{48-49}=101.0$ | 1.576 | 41.3 |
| V | $R_{49}=+2060.4$ | $T_{49-50}=27.11$ | $D_{49-50}=101.0$ | 1.623 | 57.2 |
|   | $R_{50}=-80.28$ | $S_{50-51}=.98$ |  |  |  |
| VI | $R_{51}=-219.81$ | $T_{51-52}=13.58$ | $D_{51-52}=111.0$ | 1.645 | 48.0 |
|   | $R_{52}=-105.38$ | $S_{52-53}=494.11$ |  |  |  |

This third erector assembly re-forms the third image into the eye lens assembly indicated generally by the numeral 64. The image so re-formed becomes the fourth image which is seen by the eye 65.

This assembly may also be defined as an erector lens assembly in which the first double convex lens element is made of glass having an index of refraction greater than 1.620 and in which the first radius of curvature of said double convex lens is between 1.5 and 1.7 times the focal length of said erector, and in which the second radius of curvature of said first double convex lens element is between .8 and .9 times the focal length of said erector, and in which the thickness of said first double convex lens element is between .08 and 0.1 times the focal length of said erector, and in which the last element is made of glass having an index of refraction greater than 1.62, is meniscus shaped, has a first surface which is concave with a radius of curvature of a numerical value of between 1.2 and 1.3 times the focal lenith of said erector and has a second surface which is convex with a radius of curvature between .5 and .7 times the focal length of said erector.

The eye lens 64 is composed of two positive meniscus elements 66 and 67. The construction of this eye lens assembly is shown in the following table:

TABLE 10

| Lens | Radii | Thicknesses | Diameters | $n_d$ | $\nu$ |
|---|---|---|---|---|---|
| I | $R_{53}=-2000.0$ | $T_{53-54}=10.0$ | $D_{53-54}=152.4$ | 1.649 | 33.8 |
|   | $R_{54}=-360.3$ | $S_{54-55}=1.0$ |  |  |  |
| II | $R_{55}=+360.3$ | $T_{55-56}=10.0$ | $D_{55-56}=152.4$ | 1.649 | 33.8 |
|   | $R_{56}=+2000.0$ | $S_{56-eye}=743.06$ |  |  |  |

The function of the eye lens assembly is to re-direct the bundles of light toward the eye.

In the drawing and specification, there has been set forth a preferred embodiment of the invention, and although specific terms are employed, they are used in a generic and descriptive sense only and not for purposes of limitation. Changes in form and in the proportion of parts, as well as the substitution of equivalents are contemplated, as circumstances may suggest or render expedient, without departing from the spirit or scope of this invention as further defined in the following claims.

What is claimed is:

1. A periscope type optical system comprising: a wide angle objective lens assembly consisting of a double concave lens followed by two positive lenses, a second double concave lens and a third positive lens, said first double concave lens having at least five times the power of said second double concave lens, said lens assembly being substantially uncorrected for distortion; an aspheric field lens adapted to correct the distortion of said objective lens assembly and the spherical abberration of the stop; a first erector lens assembly consisting of two strongly meniscus compoennts disposed between two positive components; a wide angle reticle aspheric field lens adapted to correct the distortion of the first erector lens assembly and the spherical aberration of the stop; a second erector lens assembly having a pair of juxtaposed thick double meniscus components having a strong concave inside surface disposed between two pairs of positive components, the outermost of said two positive components in each pair being of meniscus shape with the concave surface thereof furthermost from the convex surface of the thick double meniscus associated therewith; a second positive field lens; a third erector lens assembly consisting of a double Gauss system having two strongly bent double meniscus components disposed with their concave surfaces in adjoining relation, said two double meniscus components being preceded by a double convex lens and followed by a positive meniscus lens having the concave surface thereof disposed adjacent to the convex surface of the second double meniscus component; and an eye lens assembly consisting of two positive meniscus components.

2. A periscope type optical system of the character described in claim 1, further characterized in that said aspheric field lens has a first surface which is aspheric according to the following equation:

$$X = +a \times 10^{-3} Y^2 + b \times 10^{-6} Y^3 - c \times 10^{-6} Y^4 + d \times 10^{-9} Y^5$$

where $a$, $b$, $c$ and $d$ may have the following range of values:

| $a$ | $b$ | $c$ | $d$ |
|---|---|---|---|
| 7–7.5 | 13–13.5 | 0.1–0.3 | 2.0–3.0 | and where Y is the distance of a point on the surface from the axis of the lens and X is the distance of the same point from a plane perpendicular to the axis of the lens, and passing through the vertex of the aspheric surface; and a second surface having a radius equal to between 160 and 180 units, where all the units of specification herein have the same value.

3. A periscope type optical system of the character described in claim 1, further characterized in that said wide angle reticle aspheric field lens has a first surface having a radius equal to between 60 and 70 units and a second surface which is aspheric according to the following equation:

$$X = +a \times 10^{-3} Y^2 - b \times 10^{-6} Y^3 - c \times 10^{-6} Y^4 - d \times 10^{-9} Y^5$$

where $a$, $b$, $c$ and $d$ may have the following range of values:

| $a$ | $b$ | $c$ | $d$ |
|---|---|---|---|
| 3.0–3.6 | 20.0–23.0 | 1.0–1.5 | 1.0–1.2 | and where Y is the distance to a point on the surface from the axis of the lens and X is the distance of the same point from a plane perpendicular to the axis of the lens, and passing through the vertex of the aspheric surface, where all the units of specification herein have the same value.

4. A periscope type optical system of the character described in claim 1, further characterized in that said aspheric field lens has a first surface which is aspheric having the following equation:

$$X = +a \times 10^{-3} Y^2 + b \times 10^{-6} Y^3 - c \times 10^{-6} Y^4 + d \times 10^{-9} Y^5$$

where $a$, $b$, $c$ and $d$ may have the following range of values:

| $a$ | $b$ | $c$ | $d$ |
|---|---|---|---|
| 7–7.5 | 13–13.5 | 0.1–0.3 | 2.0–3.0 | and where Y is the distance of a point on the surface from the axis of the lens and X is the distance of the same point from a plane perpendicular to the axis of the lens, and passing through the vertex of the aspheric surface, and the second surface of which has a radius equal to between 160 and 180 units; and said reticle aspheric field lens has a first surface with a radius equal to between 60 and 70 units and a second surface which is aspheric according to the following equation:

$$X = +a \times 10^{-3} Y^2 - b \times 10^{-6} Y^3 - c \times 10^{-6} Y^4 - d \times 10^{-9} Y^5$$

where $a$, $b$, $c$ and $d$ may have the following range of values:

| $a$ | $b$ | $c$ | $d$ |
|---|---|---|---|
| 3.0–3.6 | 20.0–23.0 | 1.0–1.5 | 1.0–1.2 | and where Y is the distance of a point on the surface from the axis of the lens and X is the distance of the same point from a plane perpendicular to the axis of the lens, and passing through the vertex of the aspheric surface, where all the units of specification herein have the same value.

5. In a periscope type optical system having a wide angle objective lens assembly substantially uncorrected for distortion and an aspheric field lens adapted to correct said distortion and the spherical aberration of the stop; a first erector lens assembly consisting of two strongly meniscus components disposed between two positive components; a wide angle reticle aspheric field lens adapted to correct the distortion of the first erector lens assembly and the spherical aberration of the stop; a second erector lens assembly having a pair of juxtaposed thick double meniscus components having a strong concave inside surface disposed between two pairs of positive components, the outermost of said two positive components in each pair being of meniscus shape with the concave surface thereof furthermost from the convex surface of the thick double meniscus associated therewith; a second positive field lens; a third erector lens assembly consisting of a double Gauss system having two strongly bent double meniscus components disposed with their concave surfaces in adjoining relation, said two double meniscus components being preceded by a double convex lens and followed by a positive meniscus lens having the concave surface thereof disposed adjacent to the convex surface of the second double meniscus component; and an eye lens assembly consisting of two positive meniscus components.

6. In a periscope type optical system in which an image is formed four times, a first erector lens assembly consisting of two strongly meniscus components disposed between two positive components; a second erector lens assembly having a pair of juxtaposed thick double meniscus components having a strong concave inside surface disposed between two pairs of positive components, the outermost of said two positive components in each pair being of meniscus shape with the concave surface thereof furthermost from the convex surface of the thick double meniscus associated therewith; and a third erector lens assembly consisting of a double Gauss system having two strongly bent double meniscus components disposed with their concave surfaces in adjoining relation, said two double meniscus components being preceded by a double convex lens and followed by a positive meniscus lens having the concave surface thereof disposed adjacent to the convex surface of the second double meniscus component.

7. In a periscope type optical system, an erector lens assembly in which the first double convex lens element is made of glass having an index of refraction greater than 1.620 and in which the first radius of curvature of said double convex lens is between 1.5 and 1.7 times the focal length of said erector and in which the second radius of curvature of said first double convex lens element is between .8 and .9 times the focal length of said erector and in which the thickness of said first double convex lens element is between .08 and 0.1 times the focal length of said erector and in which the last element is made of glass having an index of refraction greater than 1.62, is meniscus shaped, has a first surface which is concave with a radius of curvature of a numerical value of between 1.2 and 1.3 times the focal length of said erector, and has a second surface which is convex with a radius of curvature between .5 and .7 times the focal length of said erector.

8. In a periscope type optical system, a wide angle objective lens assembly comprising a double concave lens followed by two positive lenses, a second double concave lens and a third positive lens, said first double concave lens having at least five times the power of said second double concave lens; and a convex-concave aspheric field lens having its first surface aspheric with a vertex radius of curvature between .36 and .44 times the numerical value of the radius of curvature of the second surface and in which the center thickness is between .25 and .28 times the numerical value of the second radius of curvature and in which the aspheric surface departs from a spherical surface by an amount which is at least .055 times the numerical value of the second radius of curvature at a point on the aspheric surface which is at a distance from the axis of said lens equal to .45 times the numerical value of the second radius of curvature.

9. In a periscope type optical system, an erector assembly comprising six elements in which the first element is convex-concave, the second element is double convex, the third and fourth elements are double concave, and the fifth and sixth elements are double convex, said sixth element being made of glass having an index higher than 1.62, a center thickness of at least 14% of the focal length, a first radius of curvature of between 1 times and 1.2 times the focal length of the erector and in which the second radius of curvature of the sixth element is between 1.1 times and 1.3 times the focal length of the erector; and a double convex aspheric field lens in which the first surface is spherical and convex and the second surface is aspherical and convex and in which the vertex radius of curvature of the aspheric surface is between 2 times and 2.5 times the radius of curvature of the first surface and in which the aspheric surface departs from a spherical surface by at least .07 times the radius of curvature of the first surface at a point removed from the axis of the aspheric a distance of .47 times the radius of curvature of the first surface.

10. In a periscope type optical system, a wide angle objective lens assembly comprising a double concave lens followed by two positive lenses, a second double concave lens and a third positive lens, said first double concave lens having at least five times the power of said second double concave lens; a convex-concave aspheric field lens having its first surface aspheric with a vertex radius of curvature between .36 and .44 times the numerical value of the radius of curvature of the second surface and in which the center thickness is between .25 and .28 times the numerical value of the second radius of curvature and in which the aspheric surface departs from a spherical surface by an amount which is at least .055 times the numerical value of the second radius of curvature at a point on the aspheric surface which is at a distance from the axis of said lens equal to .45 times the numerical value of the second radius of curvature; an erector assembly comprising six elements in which the first element is convex-concave, the second element is double convex, the third and fourth elements are double concave, and the fifth and sixth elements are double convex, said sixth element being made of glass having an index higher than 1.62, a center thickness of at least 14% of the focal length, a first radius of curvature of between 1 times and 1.2 times the focal length of the erector and in which the second radius of curvature of the sixth element is between 1.1 times and 1.3 times the focal length of the erector; and a double convex aspheric field lens in which the first surface is spherical and convex and the second surface is aspherical and convex, and in which the vertex radius of curvature of the aspheric surface is between 2 times and 2.5 times the radius of curvature of the first surface and in which the aspheric surface departs from a spherical surface by at least .07 times the radius of curvature of the first surface at a point removed from the axis of the aspheric a distance of .47 times the radius of curvature of the first surface.

11. A periscope type optical system of the character described in claim 1, further characterized in that said erector lens assembly has the constructional data specified in the following table:

[First erector assembly  EF=82.076  PTZ=.0036.]

| Lens | Radii | Thicknesses | Diameters | $n_d$ | $\nu$ |
|---|---|---|---|---|---|
| I | $R_{11}=+68.94$ | $T_{11-12}=9.6$ | $D_{11-12}=64.0$ | 1.645 | 48.0 |
|  | $R_{12}=+264.8$ | $S_{12-13}=1.3$ |  |  |  |
| II | $R_{13}=+36.95$ | $T_{13-14}=12.8$ | $D_{13-14}=50.0$ | 1.623 | 57.2 |
|  | $R_{14}=-948.4$ | $T_{14-15}=4.2$ | $D_{14-15}=50.0$ | 1.576 | 41.3 |
| III | $R_{15}=+23.34$ | $S_{15-16}=15.6$ |  |  |  |
|  | $R_{16}=-31.75$ |  |  |  |  |
| IV | $R_{17}=+41.64$ | $T_{16-17}=4.2$ | $D_{16-17}=50.0$ | 1.673 | 32.2 |
| V | $R_{18}=-43.88$ | $T_{17-18}=17.5$ | $D_{17-18}=50.0$ | 1.645 | 48.0 |
|  | $R_{19}=+87.42$ | $S_{18-19}=0.8$ |  |  |  |
| VI |  | $T_{19-20}=12.1$ | $D_{19-20}=63.0$ | 1.645 | 48.0 |
|  | $R_{20}=-98.9$ | $S_{20-21}=72$ |  |  |  | where the lens elements are designated by Roman numerals and the radii, thicknesses, and air spaces are designated by R, T, and S, respectively, with Arabic numeral subscripts and the refractive index for the "D" line of the spectrum and the reciprocal dispersion ratio are designated by $n_d$ and $\nu$, respectively, and where the equivalent focal length and Petzval curvature are designated by EF and PTZ respectively.

12. A periscope type optical system of the character described in claim 1, further characterized in that said second erector lens assembly has the constructional data specified in the following table:

[Second erector assembly  EF=179.98   PTZ=.0015.]

| Lens | Radii | Thicknesses | Diameters | $n_d$ | $\nu$ |
|---|---|---|---|---|---|
| I | $R_{25}=-199.32$ | $T_{25-26}=10.59$ | $D_{25-26}=98.0$ | 1.620 | 60.0 |
|   | $R_{26}=-129.79$ | $S_{26-27}=1.06$ |   |   |   |
| II | $R_{27}=+156.87$ | $T_{27-28}=18.0$ | $D_{27-28}=98.0$ | 1.620 | 60.0 |
|   | $R_{28}=-919.08$ | $S_{28-29}=1.8$ |   |   |   |
| III | $R_{29}=+91.93$ | $T_{29-30}=50.84$ | $D_{29-30}=92.6$ | 1.617 | 60.0 |
|   | $R_{30}=-99.34$ |   |   |   |   |
| IV | $R_{31}=+52.28$ | $T_{30-31}=3.07$ | $D_{30-31}=92.6$ | 1.617 | 36.6 |
|   |   | $S_{31-32}=30.6$ |   |   |   |
| V | $R_{32}=-52.28$ | $T_{32-33}=3.07$ | $D_{32-33}=107.4$ | 1.620 | 36.6 |
| VI | $R_{33}=+99.34$ | $T_{33-34}=50.84$ | $D_{33-34}=107.4$ | 1.620 | 60.0 |
|   | $R_{34}=-91.93$ | $S_{34-35}=1.8$ |   |   |   |
| VII | $R_{35}=+919.08$ | $T_{35-36}=18$ | $D_{35-36}=118$ | 1.620 | 60.0 |
|   | $R_{36}=-156.87$ | $S_{36-37}=1.06$ |   |   |   |
| VIII | $R_{37}=+129.79$ | $T_{37-38}=10.59$ | $D_{37-38}=118$ | 1.620 | 60.0 |
|   | $R_{38}=+199.32$ | $S_{38-39}=203.35$ |   |   |   | where the lens elements are designated by Roman numerals and the radii, thicknesses, and air spaces are designated by R, T, and S, respectively, with Arabic numeral subscripts and the refractive index for the "D" line of the spectrum and the reciprocal dispersion ratio are designated by $n_d$ and $\mu$, respectively, and where the equivalent focal length and Petzval curvature are designated by EF and PTZ respectively.

13. A periscope type optical system of the character described in claim 1, further characterized in that said third erector lens assembly has the constructional data specified in the following table:

[Third erector assembly  EF=176.53   PTZ=.0016.]

| Lens | Radii | Thicknesses | Diameters | $n_d$ | $\nu$ |
|---|---|---|---|---|---|
| I | $R_{43}=+283.74$ | $T_{43-44}=16.46$ | $D_{43-44}=98$ | 1.645 | 48.0 |
|   | $R_{44}=-156.36$ | $S_{44-45}=.98$ |   |   |   |
| II | $R_{45}=+95.34$ | $T_{45-46}=34.86$ | $D_{45-46}=88.5$ | 1.645 | 48.0 |
| III | $R_{46}=-90.46$ | $T_{46-47}=3.85$ | $D_{46-47}=88.5$ | 1.673 | 32.2 |
|   | $R_{47}=+68.99$ | $S_{47-48}=28.78$ |   |   |   |
| IV | $R_{48}=-50.7$ | $T_{48-49}=3.85$ | $D_{48-49}=101.0$ | 1.576 | 41.3 |
| V | $R_{49}=+2060.4$ | $T_{49-50}=27.11$ | $D_{49-50}=101.0$ | 1.623 | 57.2 |
|   | $R_{50}=-80.28$ | $S_{50-51}=.98$ |   |   |   |
|   | $R_{51}=-219.81$ |   |   |   |   |
| VI | $R_{52}=-105.38$ | $T_{51-52}=13.58$ | $D_{51-52}=111.0$ | 1.645 | 48.0 |
|   |   | $S_{52-53}=494.11$ |   |   |   | where the lens elements are designated by Roman numerals and the radii, thicknesses, and air spaces are designated by R, T, and S, respectively, with Arabic numeral subscripts and the refractive index for the "D" line of the spectrum and the reciprocal dispersion ratio are designated by $n_d$ and $\nu$, respectively, and where the equivalent focal length and Petzval curvature are designated by EF and PTZ respectively.

14. A periscope type optical system of the character described in claim 1, further characterized in that said eye lens has the constructional data specified in the following table:

| Lens | Radii | Thicknesses | Diameters | $n^d$ | $\nu$ |
|---|---|---|---|---|---|
| I | $R_{53}=-2000.0$ | $T_{53-54}=10.0$ | $D_{53-54}=152.4$ | 1.649 | 33.8 |
|   | $R_{54}=-360.3$ | $S_{54-55}=1.0$ |   |   |   |
| II | $R_{55}=+360.3$ | $T_{55-56}=10.0$ | $D_{55-56}=152.4$ | 1.649 | 33.8 |
|   | $R_{56}=+2000.0$ | $S_{56-eye}=743.06$ |   |   |   | where the lens elements are designated by Roman numerals and the radii, thicknesses, and air spaces are designated by R, T, and S, respectively, with Arabic numeral subscripts and the refractive index for the "D" line of the spectrum and the reciprocal dispersion ratio are designated by $n_d$ and $\nu$, respectively.

15. In a periscope type optical system a wide angle objective lens assembly comprising a double concave lens followed by two positive lens, a second double concave lens, and a third positive lens, said first double concave lens having at least five times the power of said second double concave lens, said lens assembly being substantially uncorrected for distortion, and an aspheric field lens adapted to correct the distortion of said objective lens assembly, and the spherical aberration of the stop, wherein said wide angle lens assembly has the constructional data specified in the following table:

[Objective assembly  EF=119.4 mm.  PTZ=.00097.]

| Lens | Radii | Thicknesses | Diameters | $n_d$ | $\nu$ |
|---|---|---|---|---|---|
| I | $R_1=-43.42$ | $T_{1-2}=2$ | $D_{1-2}=60.0$ | 1.720 | 29.2 |
| II | $R_2=+59.92$ | $T_{2-3}=34$ | $D_{2-3}=85.8$ | 1.574 | 56.8 |
|  | $R_3=-71.4$ | $S_{3-4}=1$ |  |  |  |
| III | $R_4=+1712.0$ | $T_{4-5}=30$ | $D_{4-5}=135.0$ | 1.620 | 60.0 |
|  | $R_5=-97.22$ | $S_{5-6}=1$ |  |  |  |
| IV | $R_6=-1350.0$ | $T_{6-7}=4$ | $D_{6-7}=168.0$ | 1.621 | 36.2 |
| V | $R_7=+201.84$ | $T_{7-8}=47$ | $D_{7-8}=168.0$ | 1.620 | 60.0 |
|  | $R_8=-151.16$ | $S_{8-9}=136$ |  |  |  | where the lens elements are designated by Roman numerals and the radii, thicknesses, and air spaces are designated by R, T, and S, respectively, with Arabic numeral subscripts and the refractive index for the "D" line of the spectrum and the reciprocal dispersion ratio are designated by $n_d$ and $\nu$, respectively, and where the equivalent focal length and Petzval curvature are designated by EF and PTZ respectively.

16. In a periscope type optical system, a wide angle lens assembly comprising a double concave lens followed by two positive lenses, a second double concave lens and a third positive lens, said first double concave lens having at least five times the power of said second double concave lens, said lens assembly being substantially uncorrected for distortion, and having the constructional data specified in the following table:

[Objective assembly  EF=119.4 mm  PTZ=.00097.]

| Lens | Radii | Thicknesses | Diameters | $n_d$ | $\nu$ |
|---|---|---|---|---|---|
| I | $R_1=-43.42$ | $T_{1-2}=2$ | $D_{1-2}=60.0$ | 1.720 | 29.2 |
| II | $R_2=+59.92$ | $T_{2-3}=34$ | $D_{2-3}=85.8$ | 1.574 | 56.8 |
|  | $R_3=-71.4$ | $S_{3-4}=1$ |  |  |  |
| III | $R_4=+1712.0$ | $T_{4-5}=30$ | $D_{4-5}=135.0$ | 1.620 | 60.0 |
|  | $R_5=-97.22$ | $S_{5-6}=1$ |  |  |  |
| IV | $R_6=-1350.0$ | $T_{6-7}=4$ | $D_{6-7}=168.0$ | 1.621 | 36.2 |
| V | $R_7=+201.84$ | $T_{7-8}=47$ | $D_{7-8}=168.0$ | 1.620 | 60.0 |
|  | $R_8=-151.16$ | $S_{8-9}=136$ |  |  |  | where the lens elements are designated by Roman numerals and the radii, thicknesses, and air spaces are designated by R, T. and S, respectively, with Arabic numeral subscripts and the refractive index for the "D" line of the spectrum and the reciprocal dispersion ratio are designated by $n_d$ and $\nu$, respectively, and where the equivalent focal length and Petzval curvature are designated by EF and PTZ respectively, and an aspheric field lens adapted to correct the distortion of said objective lens assembly and the spherical aberration of the stop, said aspheric field lens having a first surface which is aspheric according to the following equation:

$$X = +a \times 10^{-3} Y^2 + b \times 10^{-6} Y^3 - c \times 10^{-6} Y^4 + d \times 10^{-9} Y^5$$

where $a$, $b$, $c$ and $d$ may have the following range of values:

| a | b | c | d |
|---|---|---|---|
| 7–7.5 | 13–13.5 | 0.1–0.3 | 2.0–3.0 | where Y is the distance of a point on the surface from the axis of the lens and X is the distance of the same point from a plane perpendicular to the axis of the lens, and passing through the vertex of the aspheric surface; and a second surface having a radius equal to between 160 and 180 units, where all the units of specification herein have the same value.

17. In a periscope type optical system, a wide angle objective lens assembly; an aspheric field lens adapted to correct the distortion of said objective lens assembly and the spherical aberration of the stop; a first erector lens assembly consisting of two strongly menicus components disposed between two positive components, said assembly having the constructional data specified in the following table:

[First erector assembly  EF=82.076  PTZ=.0036.]

| Lens | Radii | Thicknesses | Diameters | $n_d$ | $\nu$ |
|---|---|---|---|---|---|
| I | $R_{11}=+68.94$ | $T_{11-12}=9.6$ | $D_{11-12}=64.0$ | 1.645 | 48.0 |
|  | $R_{12}=+264.8$ | $S_{12-13}=1.3$ |  |  |  |
| II | $R_{13}=+36.95$ | $T_{13-14}=12.8$ | $D_{13-14}=50.0$ | 1.623 | 57.2 |
| III | $R_{14}=-948.4$ | $T_{14-15}=4.2$ | $D_{14-15}=50.0$ | 1.576 | 41.3 |
|  | $R_{15}=+23.34$ | $S_{15-16}=15.6$ |  |  |  |
| IV | $R_{16}=-31.75$ | $T_{16-17}=4.2$ | $D_{16-17}=50.0$ | 1.673 | 32.2 |
| V | $R_{17}=+41.64$ | $T_{17-18}=17.5$ | $D_{17-18}=50.0$ | 1.645 | 48.0 |
|  | $R_{18}=-43.88$ | $S_{18-19}=0.8$ |  |  |  |
| VI | $R_{19}=+87.42$ | $T_{19-20}=12.1$ | $D_{19-20}=63.0$ | 1.645 | 48.0 |
|  | $R_{20}=-98.9$ | $S_{20-21}=72$ |  |  |  | where the lens elements are designated by Roman numerals and the radii, thicknesses, and air spaces are designated by R, T, and S, respectively, with Arabic numeral subscripts and the refractive index for the "D" line of the spectrum and the reciprocal dispersion ratio are designated by $n_d$ and $\nu$, respectively, and where the equivalent focal length and Petzval curvature are designated by EF and PTZ respectively, and a wide angle reticle aspheric field lens adapted to correct the distortion of the first erector lens assembly and the spherical aberration of the stop.

18. In a periscope type optical system the combination comprising a wide angle objective lens assembly and a convex-concave aspheric field lens; said wide angle objective lens assembly constructed to receive substantially parallel light and comprising a double concave lens followed by two positive lenses, a second double concave lens and a third positive lens, said first double concave lens having at least five times the power of said second double concave lens; said convex-concave aspheric field lens having an aspheric first surface with a vertex radius of curvature between .34 and .38 times the focal length of said field lens and an axial thickness between .22 and .25 times the focal length of said field lens and in which the said aspheric surface departs from a spherical surface by an amount which is at least 0.55 times the numerical value of the radius of curvature of the second surface at a point on the aspheric surface which is a distance from the axis of said lens equal to .45 times the numerical value of the second radius of curvature.

19. In a periscope type optical system having an objective; a convex-concave aspheric field lens which is used substantially at the image formed by the objective of the periscope type optical system for correcting distortion and spherical aberration of the stop, the convex surface of said field lens being aspheric and adjacent to the objective and the equation of generation of the said aspheric surface taking the following form:

$$X = AY^2 + BY^3 \ldots$$

where Y is the distance of a point on the surface from the axis of the lens and X is the distance of the same point from a plane perpendicular to the axis of the lens, and passing through the vertex of the aspheric surface; and where A of said equation is between $7 \times 10^{-3}$ and $7.5 \times 10^{-3}$ and B of said equation is between $13 \times 10^{-6}$ and $13.5 \times 10^{-6}$ and where the vertex radius of curvature of said aspheric surface is between .34 and .38 times the focal length of said aspheric lens, the radius of curvature of said concave surface of said aspheric lens is between .8 and 1.0 times the focal length of said aspheric lens, and in which the center thickness is between .22 and .25 times the focal length of said aspheric lens.

20. In a periscope type optical system having an objective; a convex-concave aspheric field lens which is used substantially at the image formed by the objective of the periscope type optical system for correcting distortion and spherical aberration of the stop, the convex surface of said field lens being aspherical and adjacent to the objective and in which the equation of generation of said aspherical surface takes the following form:

$$X = AY^2 + BY^3 \ldots$$

where Y is the distance of a point on the surface from the axis of the lens and X is the distance of the same point from the plane perpendicular to the axis of the lens and passing through the vertex of the aspheric surface and A and B are coefficients; and where the vertex radius of curvature of said aspheric surface is between .34 and .38 times the focal length of said lens, the radius of curvature of the spherical surface of said field lens is between .8 and 1.0 times the focal length of said field lens and the center thickness is between .22 and .25 times the focal length of said field lens.

21. In a periscope type optical system; a double convex aspheric field lens for correcting distortion and spherical aberration of the stop, in which the first surface is spherical and the second surface is aspherical and in which the equation of generation of said aspherical surface takes the form:

$$X = AY^2 - BY^3 \ldots$$

where Y is the distance of a point on the surface from the axis of the lens and X is the distance of the same point from a plane perpendicular to the axis of the lens and passing through the vertex of the aspheric surface, and A and B are coefficients; and where the vertex radius of curvature of the aspheric surface is between 1.4 and 1.85 times the focal length of said field lens, the radius of curvature of the spherical surface is between .7 and .75 times the focal length of said field lens, and the thickness is between .1 and .15 times the focal length of said field lens.

22. In a periscope type optical system; a double convex aspheric field lens for correcting distortion and spherical aberration of the stop; in which the first surface is spherical and the second surface is aspherical, the vertex radius of curvature of the aspherical surface being between 1.4 and 1.85 times the focal length of said field lens and in which the equation of generation of said aspherical surface takes the form:

$$X = AY^2 - BY^3 \ldots$$

where A of said equation is between $3 \times 10^{-3}$ and $3.6 \times 10^{-3}$ and where B of said equation is between $20 \times 10^{-6}$ and $23 \times 10^{-6}$; and where Y is the distance of a point on the surface from the axis of the lens and X is the distance of the same point from a plane perpendicular to the axis of the lens and passing through the vertex of the aspherical surface.

23. In a periscope type optical system a wide angle objective lens assembly constructed to receive substantially parallel light over a field of view of at least 70 degrees and comprising a first lens component, a second lens component, and a third lens component; said first lens component comprising a double concave first element and a double convex second element in which the first surface of said first lens element has a radius of curvature between .35 and .38 times the focal length of said wide angle objective and the second surface of said first lens element has a radius of curvature of between .48 and .52 times the focal length of said objective lens assembly and in which the first surface of said second lens element has a radius of curvature equal to that of said second surface of said first element and the second surface of said second lens element has a radius of curvature between .58 and .62 times the focal length of said wide angle objective; said second component comprising a double convex lens element in which the first surface has a radius of curvature between 10 and 100 times the focal length of said objective lens assembly and the second surface has a radius of curvature between .8 and .83 times the focal length of said objective lens assembly; and said third component comprising a double concave lens element followed by a double convex lens element, in which the first surface of said first lens element has a radius of curvature between 10 and 100 times the focal length of said objective lens assembly and the second surface of said first element has a radius of curvature between 1.6 and 1.8 times the focal length of said objective lens assembly and in which the first surface of said second lens element of said third component has a radius of curvature equal to said second surface of said first lens element of said third lens component and the second surface of said second lens element has a radius of curvature between 1.2 and 1.3 times the focal length of said objective lens assembly.

References Cited in the file of this patent

UNITED STATES PATENTS

| Number | Name | Date |
|---|---|---|
| 934,579 | Straubel et al. | Sept. 21, 1909 |
| 1,786,916 | Merte | Dec. 30, 1930 |
| 2,117,252 | Lee | May 10, 1938 |
| 2,206,155 | Boegehold | July 2, 1940 |
| 2,398,276 | Altman | Apr. 9, 1946 |
| 2,453,336 | Orser | Nov. 9, 1948 |
| 2,481,639 | Altman et al. | Sept. 13, 1949 |
| 2,510,419 | Ross | June 6, 1950 |
| 2,644,362 | Ravizza et al. | July 7, 1953 |
| 2,701,982 | Angenieux | Feb. 15, 1955 |
| 2,719,457 | Tripp | Oct. 4, 1955 |

FOREIGN PATENTS

| Number | Country | Date |
|---|---|---|
| 947,068 | France | Jan. 3, 1949 |
| 924,539 | Germany | Mar. 3, 1955 |

UNITED STATES PATENT OFFICE

CERTIFICATE OF CORRECTION

Patent No. 2,893,290                                    July 7, 1959

John R. Miles

It is hereby certified that error appears in the printed specification of the above numbered patent requiring correction and that the said Letters Patent should read as corrected below.

Column 8, line 10, for "detals" read -- details --; line 37, for "whirh" read -- which --; line 52, for "lenith" read -- length --; column 9, line 19, for "compoennts" read -- components --; column 12, line 71, and column 13, line 34, for "$\mu$", italicized, each occurrence, read -- $v$ --, italicized; columns 13 and 14, in the table, fifth column thereof, in the heading, for "$n_d$", italicized, read -- $n_d$ --, italicized; column 15, line 3, for "lens" read -- lenses --; column 16, line 20, for "menicus" read -- meniscus --; line 68, for "0.55" read -- .055 --.

Signed and sealed this 31st day of May 1960.

(SEAL)
Attest:

KARL H. AXLINE                                                      ROBERT C. WATSON
Attesting Officer                                             Commissioner of Patents